US008799444B2

(12) United States Patent
Wakumoto et al.

(10) Patent No.: US 8,799,444 B2
(45) Date of Patent: Aug. 5, 2014

(54) AUTOMATED HOST DISCOVERY AND PATH TRACING BY NETWORK MANAGEMENT SERVER

(75) Inventors: Shaun Kazuo Wakumoto, Roseville, CA (US); Sarayu Chandrapal, Roseville, CA (US); Ballard Claude Bare, Auburn, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1516 days.

(21) Appl. No.: 11/084,310

(22) Filed: Mar. 18, 2005

(65) Prior Publication Data
US 2006/0209852 A1 Sep. 21, 2006

(51) Int. Cl.
*H04L 12/56* (2006.01)
(52) U.S. Cl.
USPC ........... 709/224; 370/254; 370/401; 380/255; 380/260; 380/276; 713/150; 713/155; 713/181

(58) Field of Classification Search
USPC ........... 709/224; 370/254, 401; 380/255, 260, 380/276; 713/150, 155, 180
See application file for complete search history.

(56) References Cited

U.S. PATENT DOCUMENTS

| 4,947,365 | A | 8/1990 | Masubuchi |
| 5,675,578 | A | 10/1997 | Gruber et al. |
| 6,538,997 | B1 | 3/2003 | Wang et al. |
| 7,035,266 | B2 * | 4/2006 | Binder ............... 370/395.53 |
| 2003/0142685 | A1 * | 7/2003 | Bare ............... 370/410 |
| 2005/0198224 | A1 * | 9/2005 | Kobayashi et al. ........... 709/220 |
| 2006/0036818 | A1 * | 2/2006 | Mizuno et al. ............ 711/156 |

* cited by examiner

*Primary Examiner* — Jason K. Gee
*Assistant Examiner* — Sharif E Ullah

(57) ABSTRACT

One embodiment described relates to an automated method of host discovery and path tracing by a network management server. The method includes discovery of a location in the network of a source host, discovery of a location in the network of a destination host, and discovery of a path from the source host to the destination host. Other embodiments are also described.

15 Claims, 8 Drawing Sheets

AUTOMATED HOST DISCOVERY AND PATH TRACING BY NETWORK MANAGEMENT SERVER

BACKGROUND OF THE INVENTION

1. Field of the Invention

The present invention relates generally to communication networks.

2. Description of the Background Art

It is common in conventional computing environments to connect a plurality of computing systems or "hosts" through a communication medium often referred to as a network. The network permits the hosts to exchange and share information. Networks typically include various network devices, such as routers, switches, and hubs, in addition to the interconnected hosts.

Networks may be configured and graphically depicted in a wide variety of common topologies. The particular configurations of network communication links and devices between a particular pair of hosts wishing to exchange information may be widely varied. Any particular connection between two hosts attached to a network may be direct or may pass through a large number of intermediate devices in the network. Networks are therefore complex and vary in their configurations and topologies.

Certain network communication media and protocols are referred to as packet oriented. A protocol or communication medium may be said to be packet oriented in that information to be exchanged over the network is broken into discrete sized packets of information. A block of information to be transferred over the network is decomposed into one or more packets for purposes of transmission over the network. At the receiving end of the network transmission, the packets are re-assembled into the original block of data.

In general, each packet includes embedded control and addressing information that identifies the source device which originated the transmission of the packet and which identifies the destination device to which the packet is transmitted. Identification of source and destination devices is by means of an address associated with each device. An address is an identifier which is unique within the particular computing network to identify each device associated with the network. Such addresses may be unique to only a particular network environment (i.e., a network used to interconnect a single, self-contained computing environment) or may be generated and assigned to devices so as to be globally unique in co-operation with networking standards organizations. At one level of network communication, such addresses are often referred to as MAC (Media Access) addresses. Network protocols operable above this lowest level of communication may use other addresses, such as IP (Internet Protocol) addresses, for other purposes in the higher-level communication techniques.

SUMMARY

One embodiment of the invention pertains to an automated method of host discovery and path tracing by a network management server. The method includes discovery of a location in the network of a source host, discovery of a location in the network of a destination host, and discovery of a path from the source host to the destination host.

Another embodiment of the invention pertains to an automated method at a network management server of discovering a location of a host associated with at least a MAC address. A look up is performed for next port associated with the MAC address at a neighbor device. A determination is made as to whether the next port is connected to another neighbor device. The look up and determination are repeated if the next port is connected to another neighbor device.

Another embodiment of the invention pertains to an automated method at a network management server of tracing a path from a source host to a destination host. A look up is performed for a next port associated with a MAC address for the destination host at a neighbor device. A determination is made as to whether the next port is connected to another neighbor device. The look up and determination are repeated if the next port is connected to another neighbor device.

Another embodiment of the invention pertains to a network management apparatus with automated host discovery and path tracing. The apparatus includes computer-executable code configured to discover a location of a source host, computer-executable code configured to discover a location of a destination host, and computer-executable code configured to discover a path from the source host to the destination host.

Another embodiment of the invention pertains to a network management apparatus with automated discovery of a location of a host associated with at least a MAC address. The apparatus includes computer-executable code configured to look up a next port associated with the MAC address at a neighbor device, computer-executable code configured to determine whether the next port is connected to another neighbor device, and computer-executable code configured to repeat said look up and determination if the next port is connected to another neighbor device.

Another embodiment of the invention pertains to a network management apparatus with automated tracing of a path from a source host to a destination host. The apparatus includes computer-executable code configured to look up a next port associated with a MAC address for the destination host at a neighbor device, computer-executable code configured to determine whether the next port is connected to another neighbor device, and computer-executable code configured to repeat said lookup and determination if the next port is connected to another neighbor device.

Other embodiments are also described.

DETAILED DESCRIPTION

I. Example Network

Figure 1:
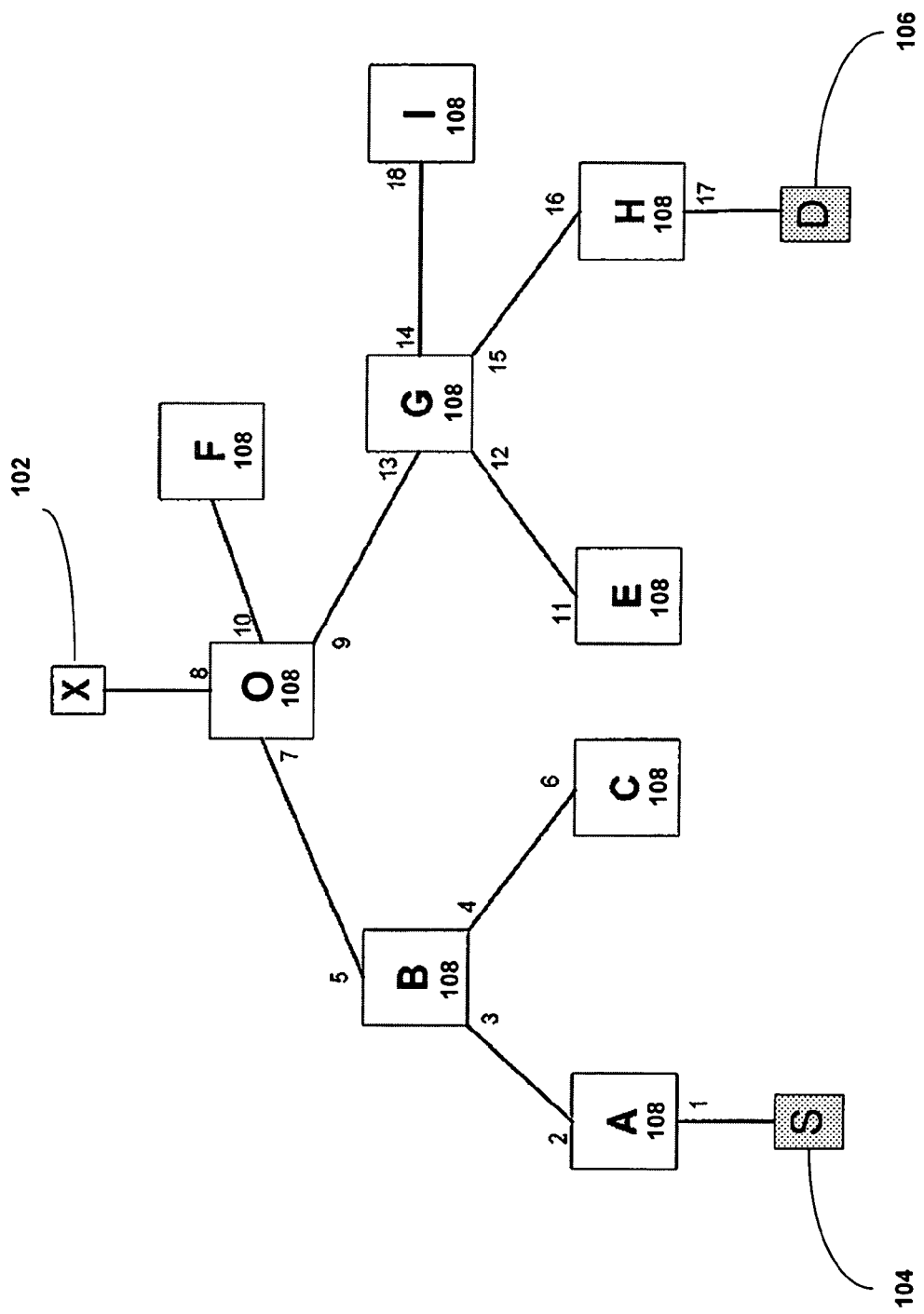
FIG. 1 is a diagram depicting an example network.

FIG. 1 is a diagram depicting an example network. The example network includes various interconnected network devices 108 (A, B, C, O, E, F, G, H, and I) and a network management server on the Host X 102. In other words, Host X is configured to contain and run the network management server application. In this particular example, for purposes of ease of discussion, consider that the network devices 108 each comprise a switch. Networks with other network devices, such as routers and hubs, are discussed below in relation to FIGS. 5 and 6.

Various hosts may be connected to the network devices 108. In this instance, two particular hosts are shown. The two hosts are the source host S 104 and the destination host D 106 for a packet of interest. The packet of interest is a packet for which the network management server X performs an automated end-to-end path trace in accordance with an embodiment of the invention.

As shown, the network devices 108 are interconnected by network links, and the ports for the links are indicated in FIG. 1. For example, the link between network devices B and O connects port 5 of network device B with port 7 of network device O. In addition, the ports from the network devices to the hosts are also shown. For example, the network device O connects to Host X by way of port 8 of the network device O.

Referring to the example network of FIG. 1, consider that the network management station (Host X running the network management application) is instructed to make an automated trace of the end-to-end path for a particular packet of interest. In accordance with an embodiment of the invention, the network management application may include code configured to perform such an automated trace using the steps shown in FIG. 2.

II. High-Level Flow Chart

Figure 2:
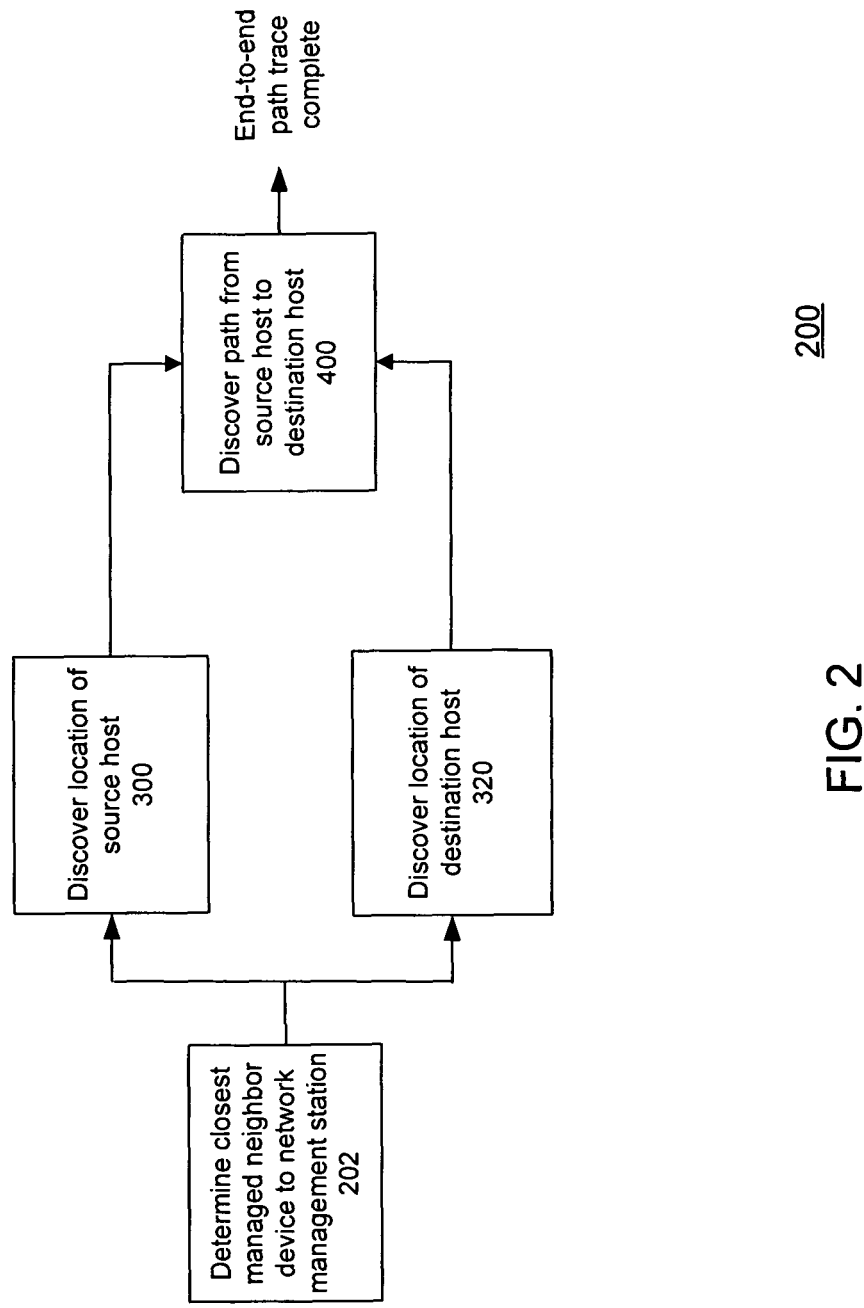
FIG. 2 is a flow chart depicting an automated method of end-to-end path tracing by a network management server in accordance with an embodiment of the invention.

FIG. 2 is a high-level flow chart depicting an automated method 200 of end-to-end path tracing by a network management server in accordance with an embodiment of the invention. The automated method 200 may be divided into a preliminary process 202, and three smaller automated sub-methods (300, 320, and 400).

As a preliminary matter, a network discovery engine of the management application performs discovery of managed devices in the network. The initial network discovery setting includes the starting device, also known as the root device or switch, of the managed network. Given the root switch, a network management server may look at the root switch's neighbor table and locate its neighboring devices. With this information on the managed neighbor devices, the network management server can look each neighbor to find the next neighbors, and so on. The neighbor information may be built using a neighbor discovery protocol, such as Cisco Discovery Protocol, Foundry Discovery Protocol, Link Layer Discovery Protocol (IEEE 802.1ab), and so on.

Of particular relevance here, the network management station X may determine 202 its closest neighbor device. Consider that the network management station X is aware of the starting or root device in the managed network. For example, consider that the root switch is Switch C in the example network of FIG. 1. In this example, Host X may first ping Switch C (our example root switch). When Switch C responds, it is known that all switches between Host X and Switch C have Host X's MAC address in their MAC address tables. Also, when Host X pings another host on the network, the first packet will most likely be an address resolution protocol (ARP) request. Because the ARP request is a broadcast packet, it travels over the entire layer 2 broadcast domain.

Hence, in the case where the network devices are all layer 2 switches, then all those switches will have thus learned Host X's MAC address in their MAC address tables.

Host X may then use simple network management protocol (SNMP) to obtain the port associated with MAC address X on Switch C. In this instance, MAC address X is associated with port 6 of Switch C. Host X may then ask Switch C who its neighbor switch is on port 6. In this case, it is Switch B. Host X may then repeat the same process for Switch B and discover that MAC address X is associated with port 5 of Switch B and that its neighbor is Switch O. Switch O has MAC address X associated on port 8. As such, Switch O has no neighbor device associated with port 8. Therefore, it may be assumed that Host X is closest to Switch O.

Once the closest network device to the network management station has been determined 202, the network management station is ready to discover the host locations per the first and second sub-methods 300 and 320.

In the first smaller automated method 300, the location of the source host for the packet is discovered or determined. This method 300 is described further below in relation to FIG. 3A. In the second smaller automated method 320, the location of the destination host for the packet is discovered or determined. This method 320 is described further below in relation to FIG. 3B. Note that these two sub-methods may be performed with either one being first, or may be performed in parallel as indicated in FIG. 2. Finally, in the third smaller automated method 400, the path is discovered from the located source host to the located destination source. This third sub-method 400 is performed after the source and destination hosts have been successfully located. This method 400 is described further below in relation to FIG. 4.

III. Locating Source Host

Figure 3A:
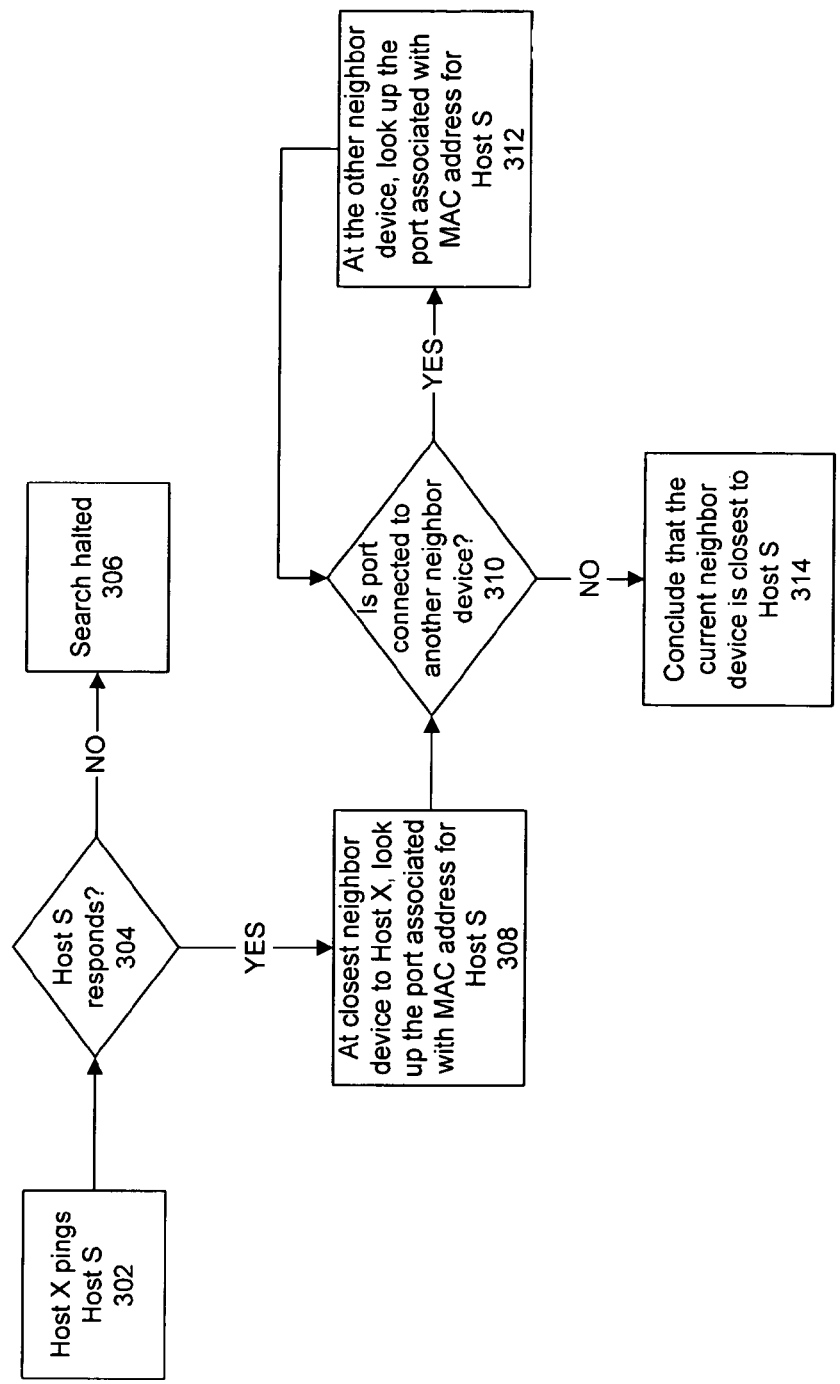
FIG. 3A is a flow chart depicting an automated process of locating a source host for a packet by a network management station in accordance with an embodiment of the invention.

FIG. 3A is a flow chart depicting an automated sub-method or process 300 of locating a source host for a packet by a network management station in accordance with an embodiment of the invention. This method 300 may be implemented, for example, in code within a module of the network management application.

Referring to the example network of FIG. 1, consider the automated method 300 of the network management station X 102 locating the source host S 104 for a particular packet of interest. In accordance with an embodiment of the invention, the Host X first "pings" 302 Host S. In other words, an ICMP (Internet Control Message Protocol) "echo" packet is sent from Host X with Host S as its destination. In addition to ping requests, IEEE test packets may also be used to try and force a host or switch to respond. If a host or switch does not responds to neither pings nor IEEE test packets, then a TCP connection may be attempted to well known ports of the host or switch that would be open (i.e. listening for incoming connections). For example, TCP port 22 for SSH (the remote login protocol), or TCP port 23 for Telnet, and so on. Attempting such a TCP connection is another way of trying to force a host or switch to respond on the network (so that all switches and routers along the path to Host D learns the MAC address of Host X.

In general, sending the ping request is the preferred method as all IP hosts will respond and it works across router boundaries. Within a non-router environment (switches or switches and hub), an ARP (address resolution protocol) request should be sufficient for IP hosts since this will populate the MAC address table of all the switches along the path back to the management station. Use of a ping request in such a non-router environment may be thought of as another vehicle for initiating the ARP request, but it is actually the broadcast ARP request and the unicast ARP response that populates the MAC address table.

A determination 304 is then made as to whether Host S responds or not. If a ping (or other) response from Host S is not received by Host X, then the search to locate Host S may be halted 306 as there appears to be no working path from Host X to Host S.

On the other hand, if a ping (or other) response from Host S is received by Host X, then the method 300 continues by performing a look-up 302 at the closest neighbor device to Host X. In the example network of FIG. 1, the closest managed neighbor device comprises Switch O.

Starting at Switch O (the closest network device to the network management server), a look-up is performed 308 at Switch O using the MAC address for Host S so as to discover that this address is associated with port 7. A determination 310 is then made as to whether this port is connected to another managed neighbor device.

In this case, it is determined 310 that Switch O's port 7 connects to the neighbor Switch B. Hence, a look-up is performed 312 at Switch B using the MAC address for Host S so as to discover that this address is associated with port 3. The process 300 then loops back so that a determination 310 is made as to whether this port is connected to another managed neighbor device.

In this instance, it is determined 310 that Switch B's port 3 connects to the neighbor Switch A. Hence, a look-up is performed 312 at Switch A using the MAC address for Host S so as to discover that this address is associated with port 1. The process 300 then loops back so that a determination 310 is made as to whether this port is connected to another managed neighbor device.

Finally, it is determined 310 that Switch A's port 1 does not connect to a managed neighbor device. Hence, it is concluded that Switch A (the "current" neighbor device) is the closest neighbor device to Host S (the source host). Once Host S's closest neighbor device has been determined, then this location for Host S can be graphically displayed in the network topology.

IV. Locating Destination Host

Figure 3B:
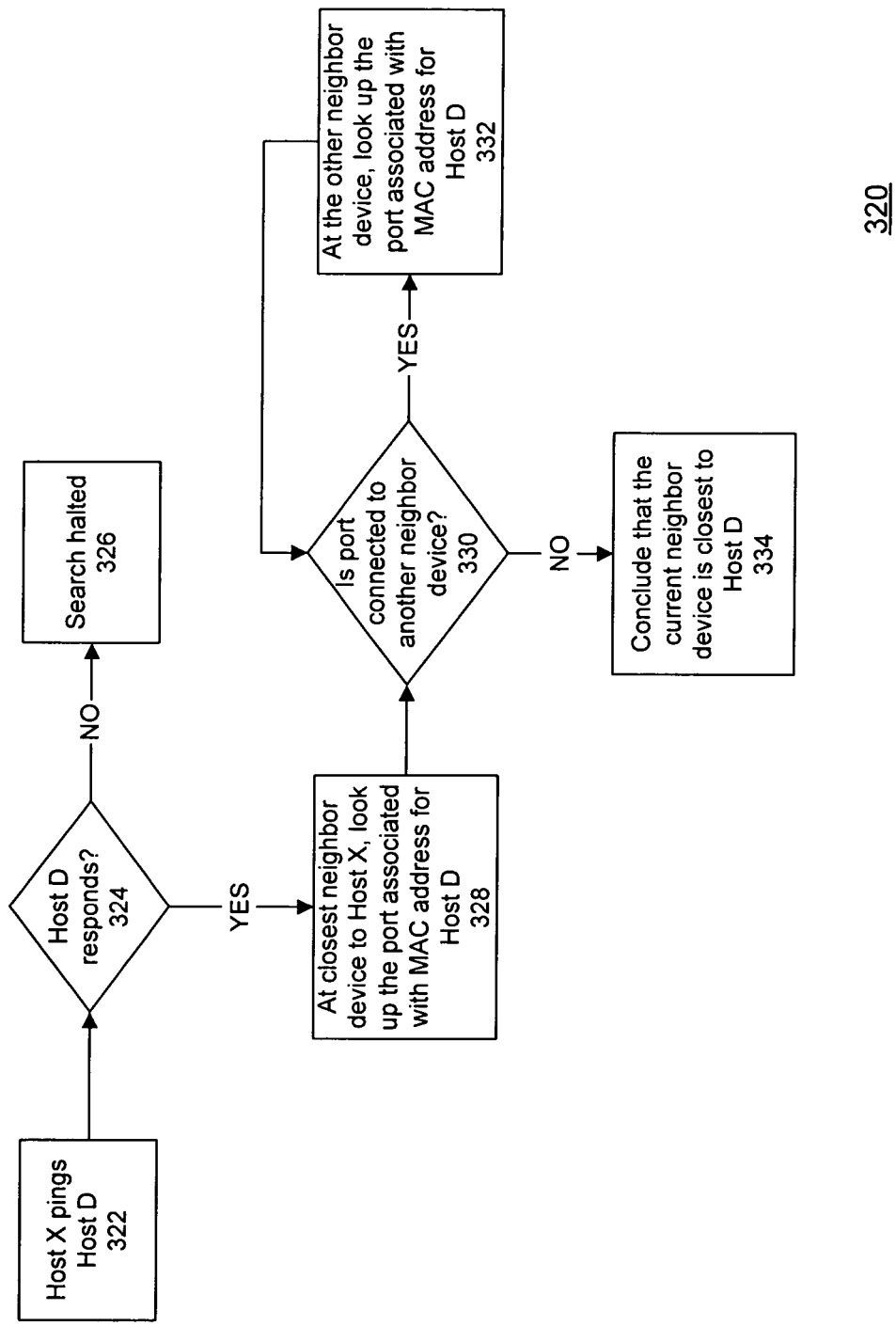
FIG. 3B is a flow chart depicting an automated process of locating a destination host for a packet by a network management station in accordance with an embodiment of the invention.

Similar to FIG. 3A, FIG. 3B is a flow chart depicting an automated sub-method or process 320 of locating a destination host for a packet by a network management station in accordance with an embodiment of the invention. This method 320 may also be implemented, for example, in code within a module of the network management application.

Referring to the example network of FIG. 1, consider the automated method 320 of the network management station X 102 locating the destination host D 106 for a particular packet of interest. In accordance with an embodiment of the invention, the Host X first "pings" 322 Host D. In other words, an ICMP (Internet Control Message Protocol) "echo" packet is sent from Host X with Host D as its destination. In addition to ping requests, IEEE test packets may also be used to try and force a host or switch to respond. If a host or switch does not responds to neither pings nor IEEE test packets, then a TCP connection may be attempted to well known ports of the host or switch that would be open (i.e. listening for incoming connections). For example, TCP port 22 for SSH (the remote login protocol), or TCP port 23 for Telnet, and so on. Attempting such a TCP connection is another way of trying to force a host or switch to respond on the network (so that all switches and routers along the path to Host D learns the MAC address of Host X.

In general, sending the ping request is the preferred method as all IP hosts will respond and it works across router boundaries. Within a non-router environment (switches or switches and hub), an ARP (address resolution protocol) request should be sufficient for IP hosts since this will populate the MAC address table of all the switches along the path back to the management station. Use of a ping request in such a non-router environment may be thought of as another vehicle for initiating the ARP request, but it is actually the broadcast ARP request and the unicast ARP response that populates the MAC address table.

A determination 324 is then made as to whether Host D responds or not. If a ping (or other) response from Host D is not received by Host X, then the search to locate Host D may be halted 326 as there appears to be no working path from Host X to Host D.

On the other hand, if a ping (or other) response from Host D is received by Host X, then the method 320 continues by performing a look-up 322 at the closest neighbor device to Host X. In the example network of FIG. 1, the closest managed neighbor device comprises Switch O.

Starting at Switch O (the closest network device to the network management server), a look-up is performed 328 at Switch O using the MAC address for Host D so as to discover that this address is associated with port 9. A determination 330 is then made as to whether this port is connected to another managed neighbor device.

In this case, it is determined 330 that Switch O's port 9 connects to the neighbor Switch G. Hence, a look-up is performed 332 at Switch G using the MAC address for Host D so as to discover that this address is associated with port 15. The process 320 then loops back so that a determination 330 is made as to whether this port is connected to another managed neighbor device.

In this instance, it is determined 330 that Switch G's port 15 connects to the neighbor Switch H. Hence, a look-up is performed 332 at Switch H using the MAC address for Host D so as to discover that this address is associated with port 17. The process 320 then loops back so that a determination 330 is made as to whether this port is connected to another managed neighbor device.

Finally, it is determined 330 that Switch H's port 17 does not connect to a managed neighbor device. Hence, it is concluded that Switch H (the "current" neighbor device) is the closest neighbor device to Host D (the destination host). Once Host D's closest neighbor device has been determined, then this location for Host D can be graphically displayed in the network topology.

V. Tracing Path Between Source and Destination Hosts

Figure 4:
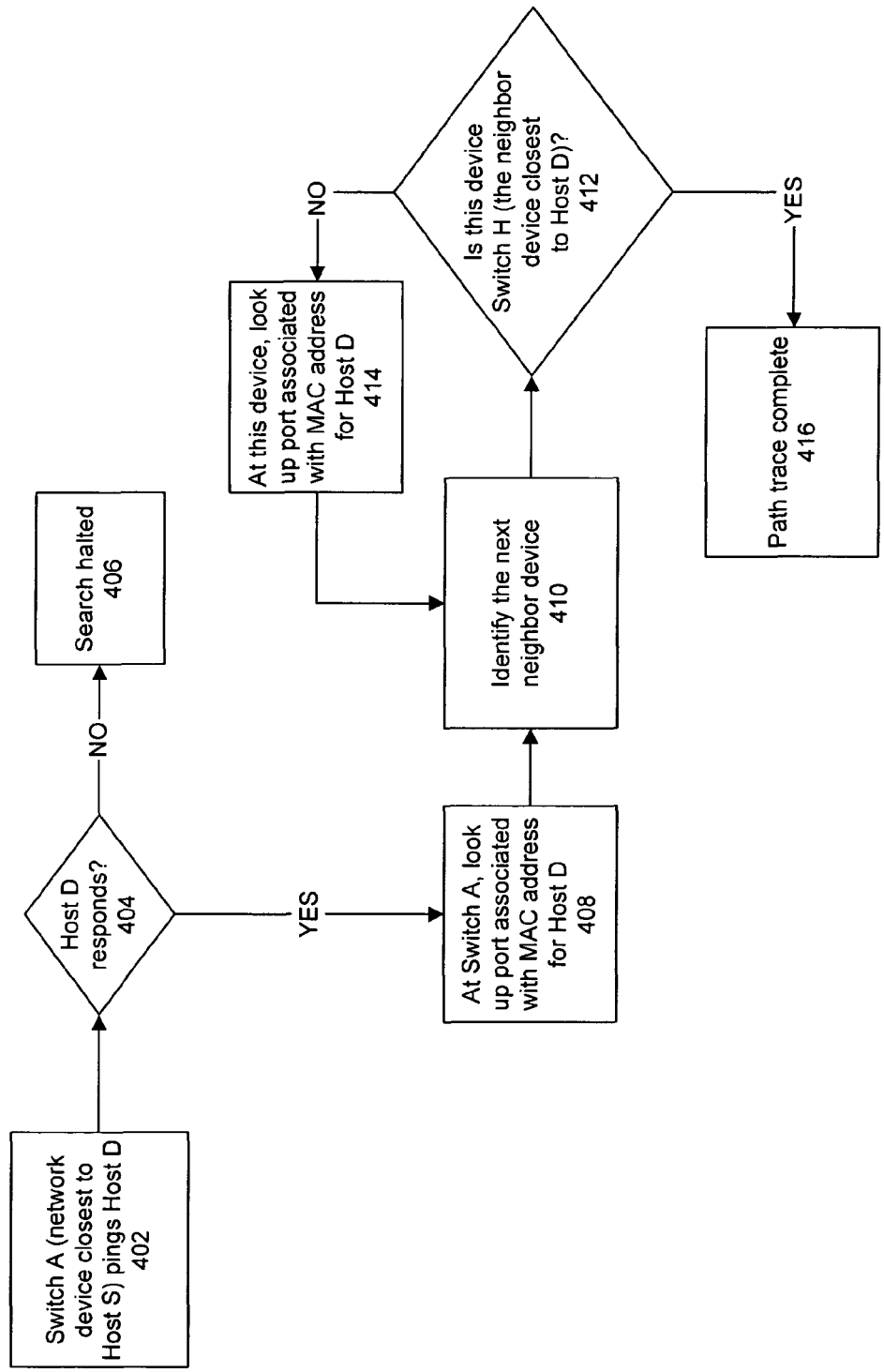
FIG. 4 is a flow chart depicting an automated process of path tracing from source host to destination host by a network management station in accordance with an embodiment of the invention.

FIG. 4 is a flow chart depicting an automated sub-method or process 400 of path tracing from source host to destination host by a network management station in accordance with an embodiment of the invention. This method 400 may also be implemented, for example, in code within a module of the network management application.

Referring to the example network of FIG. 1, consider the automated method 400 of the network management station X 102 tracing the path from the source host S 104 to the destination host D 106. In accordance with an embodiment of the invention, Switch A (the network device closest to Host S) first "pings" 402 Host D. In other words, an ICMP (Internet Control Message Protocol) "echo" packet is sent from Switch A with Host D as its destination. In addition to ping requests, IEEE test packets may also be used to try and force a host or switch to respond. If a host or switch does not responds to neither pings nor IEEE test packets, then a TCP connection may be attempted to well known ports of the host or switch that would be open (i.e. listening for incoming connections).

For example, TCP port 22 for SSH (the remote login protocol), or TCP port 23 for Telnet, and so on. Attempting such a TCP connection is another way of trying to force a host or switch to respond on the network (so that all switches and routers along the path to Host D learns the MAC address of Switch A.

A determination 404 is then made as to whether Host D responds or not. If a ping (or other) response from Host D is not received by Switch A, then the search for the path may be halted 406 as there appears to be no working path from Host S to Host D.

On the other hand, if a ping (or other) response from Host D is received by Switch A, then the method 400 continues by performing a look-up 408 at Switch A using the MAC address for Host D so as to discover that this address is associated with port 2. The next managed neighbor device to which this port is connected is then identified 410, and a determination 412 is made as to whether this next neighbor device is Switch H (the neighbor device previously determined to be closest to Host D).

In this case, the next neighbor device is identified 410 as Switch B, and it is determined 412 that Switch B is not Switch H (i.e. is not the neighbor device closest to Host D). Hence, a look up is performed 414 at Switch B using the MAC address for Host D so as to discover that this address is associated with port 5. The process 400 then loops back so that the next managed neighbor device to which this port is connected is then identified 410, and a determination 412 is made as to whether this device is Switch H.

In this instance, the next neighbor device is identified 410 as Switch O, and it is determined 412 that Switch O is not Switch H. Hence, a look up is performed 414 at Switch O using the MAC address for Host D so as to discover that this address is associated with port 9. The process 400 then loops back so that the next managed neighbor device to which this port is connected is then identified 410, and a determination 412 is made as to whether this device is Switch H.

In this case, the next neighbor device is identified 410 as Switch G, and it is determined 412 that Switch G is not Switch H. Hence, a look up is performed 414 at Switch G using the MAC address for Host D so as to discover that this address is associated with port 15. The process 400 then loops back so that the next managed neighbor device to which this port is connected is then identified 410, and a determination 412 is made as to whether this device is Switch H.

Finally, it is determined 412 that the next neighbor device is indeed Switch H. Hence, the path trace is complete, with the resultant path going from Host S to Switch A to Switch B to Switch O to Switch G to Switch H to Host D. Once the path has been determined, then this path from Host S to Host D can be graphically displayed in the network topology.

The above-discussed host discovery and path trace methodologies may be modified for networks where the neighbor devices include more than layer 2 switches. The sections below discuss modification of the methodologies for paths traversing routers and hubs, and for networks including virtual local area networks (VLANs).

VI. Routers

Traversing over a router is performed differently than traversing over a switch. When performing a host discover across the router, an update of the MAC address which is being looked-up should be performed when going to the layer 2 network on the other side of the router.

Figure 5:
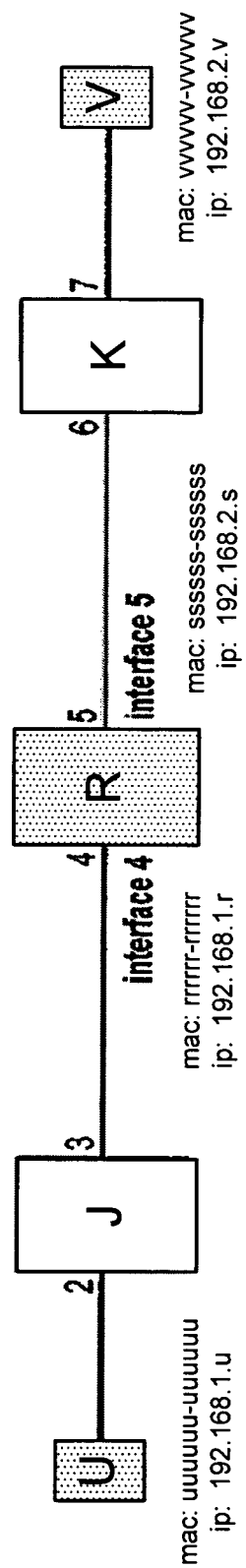
FIG. 5 is a diagram of an example path going through a router.

FIG. 5 is a diagram of an example path between two hosts that traverses a router. In FIG. 5, U and V are hosts, J and K are layer 2 switches, and R is a layer 3 router.

Consider that a host discovery or path trace is being performed from Host U to Host V, and that Switch J has been determined as the closest neighbor device to Host U. Note also that Host U and Host V are on different IP subnets. A first subnet 192.168.1.x contains Host U, and a second subnet 192.168.2.x contains Host V. The modified methodology for the host discovery may proceed as follows.

A ping is sent from Host U to Host V. After the ping completes successfully, Host U will have an entry in its ARP cache with MAC address rrrrrr-rrrrrr and IP address 192.168.2.v, where v is a number from 0 to 255 which is associated with Host V. MAC address rrrrrr-rrrrrr is the MAC address of the router R on the first subnet.

The network management server starts the host discovery or path trace at Switch J, and looks up port 3 based on the MAC address rrrrrr-rrrrrr. It is determined that the neighbor device on Switch J's port 3 is router R. Once at the router, a look-up at router R's ARP cache using the IP address 192.168.2.v finds that the MAC address for Host V on the second subnet is vvvvvv-wvvvv. The MAC address in the methodology is now updated to this MAC address for the new subnet.

The procedure goes on and finds that the MAC address vvvvvv-vvvvvv is associated with router R's port 5 (interface 5). It is determined that the neighbor device on Router's port 5 is Switch K. Once at Switch K, it is found that MAC address vvvvvv-vvvvvv is associated with Switch K's port 7, and that port 7 has no neighbor device (i.e. no switch or router neighbor). Therefore, it is concluded that Host V is located next to port 7 of Switch K.

VII. Hubs

Traversing hubs presents another difficulty whose solution is hereby disclosed. Hubs are typically unmanaged and typically do not support any neighbor discovery protocols. Therefore, a device connected to a hub will see all devices connected to the hub in its neighbor table. The same can be said for some other network devices that act like hubs in this respect.

Figure 6:
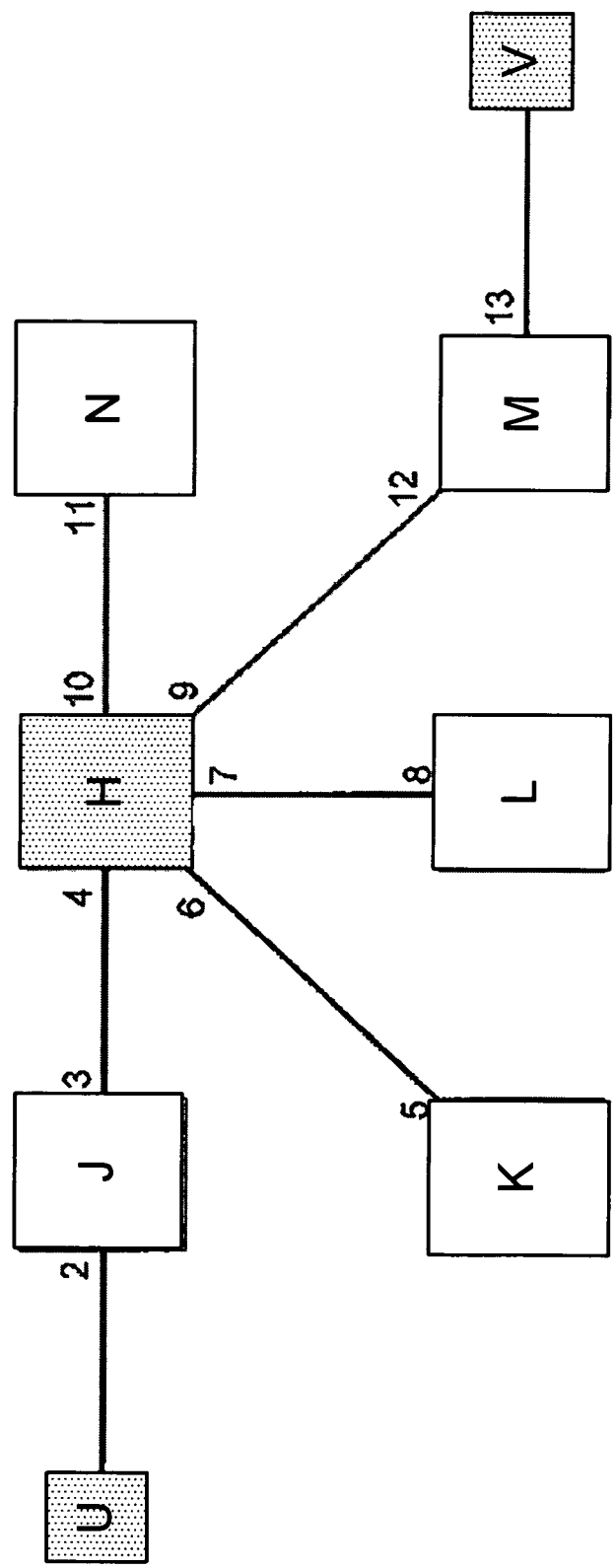
FIG. 6 is a diagram of an example path going through a hub.

FIG. 6 is a diagram of an example path between two hosts that traverses a hub. In FIG. 6, U and V are hosts, J, K, L, M and N are layer 2 switches, and H is a network hub.

In this example, Switches J, K, L and M will be in Switch N's neighbor table. Switches J, K, L and N will be in Switch M's neighbor table. Switches J, K, M and N will be in Switch L's neighbor table. Switches J, L, M and N will be in Switch K's neighbor table. Finally, Switches K, L, M and N will be in Switch J's neighbor table.

Consider that a host discovery or path trace is being performed from Host U to Host V, and that Switch J has been determined as the closest neighbor device to Host U.

A ping is sent from Host U to Host V. The network management server starts the path trace at Switch J, and looks up port 3 based on the MAC address for Host V. Switch J's port 3 connect to Hub H. However, since Hub H is unmanaged, Switch J has four neighbor switches (switches K, L, M and N) associated with port 3. In order to discover which of these neighbor switches leads to Host V, these neighbor switches may be checked one at a time.

For example, consider that Switch K is first checked. Determinations are made as to the relevant ingress and egress ports of Switch K. The relevant ingress port of Switch K is the port used to get to Switch K from Hub H. The relevant egress port of Switch K is determined by looking up the port of Switch K which is associated with the MAC address for Host V. In this instance, the relevant ingress and egress ports are both port 5. Since the relevant ingress and egress ports are the same, it is concluded that Host V is not located on (or the path to Host V does not go through) Switch K.

Next, consider that Switch L is checked. Determinations are made as to the relevant ingress and egress ports of Switch L. In this instance, the relevant ingress and egress ports are both port 8. Since the relevant ingress and egress ports are the same, it is concluded that Host V is not located on (or the path to Host V does not go through) Switch L.

Next, consider that Switch M is checked. Determinations are made as to the relevant ingress and egress ports of Switch M. In this instance, the relevant ingress port is port 12, but the relevant egress port is port 13. Since the relevant ingress and egress ports are different, it is concluded that Host V is located on (or the path to Host V goes through) Switch M. Subsequently, looking at Switch M's neighbor table, it is found that there is no neighbor switches/routers associated with port 13. Hence, it is concluded that Host V is connected to Switch M on port 13.

VIII. Virtual Local Area Networks

A host can exist on multiple VLANs if it has multiple network cards and is on different subnets. It is also very likely that a switch may also be on multiple VLANs. The path that a packet would take to get to a given host may be one path in one VLAN, but may be another path on a different VLAN.

Such a situation may occur, for example, when multiple-instance spanning tree protocol (MSTP) is running in the network. See IEEE 802.1s for more information on MSTP.

Figure 7:
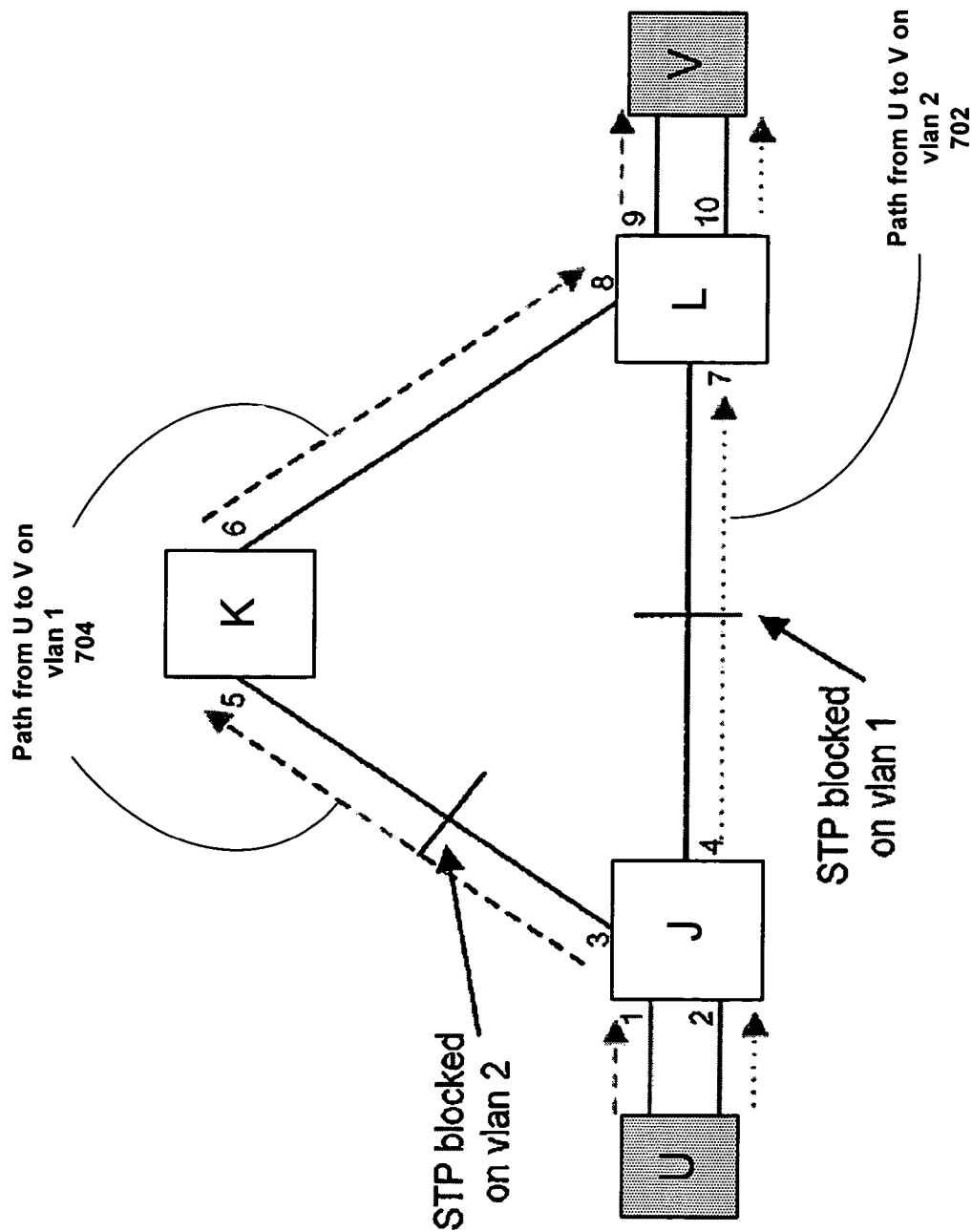
FIG. 7 is a diagram of an example network with VLANs.

FIG. 7 is a diagram of an example MSTP network. There are two VLANs in this example, vlan 1 and vlan 2. Hosts U and V are both on vlan 1 and vlan 2. Switches J, K and L are all running MSTP and are in both vlan 1 and vlan 2. For simplified explanation, multiple network cards are shown for each host. However, a host (or other network device) may have a single connection with another host but still be on multiple VLANs, for example, by using VLAN tagging.

MSTP allows a network administrator to overlap multiple instances of spanning tree protocol (STP) by grouping a VLAN in an STP instance. For example, vlan 1 may be in one instance of MSTP, and vlan 2 may be in another instance of MSTP. Each MSTP instance may block different links, for example, due to STP port priority and/or cost.

In the example of FIG. 7, the port between Switch J and Switch K is blocked on vlan 2, while the port between Switch J and Switch L is blocked on vlan 1. The path between Host U and Host V on vlan 1 is Host U to Switch J to Switch K to Switch L to Host V. The path between Host U and Host V on vlan 2 is Host U to Switch J to Switch L to Host V.

When a path trace (or host discovery) is performed between Host U and Host V, the network management server may first determine the appropriate VLAN that will be used for a given IP address. IP subnets are typically broken up by VLANs.

In order to find the path that a packet would take from Host U to Host V on vlan 1, vlan 1 is specified when looking up the port associated with Host V's MAC address in each switch's MAC table. At Switch J, when looking up the port associated with the MAC address for Host V and specifying vlan 1, port 3 would be found as associated with Host V. At Switch K, when looking up the port associated with the MAC address for Host V and specifying vlan 1, port 6 would be found as associated with Host V. Finally, at Switch L, when looking up the port associated with the MAC address for Host V and specifying vlan 1, port 9 would be found as associated with Host V.

In order to find the path that a packet would take from Host U to Host V on vlan 2, vlan 2 is specified when looking up the port associated with Host V's MAC address in each switch's MAC table. At Switch J, when looking up the port associated with the MAC address for Host V and specifying vlan 2, port 4 would be found as associated with Host V. At Switch L, when looking up the port associated with the MAC address for Host V and specifying vlan 2, port 10 would be found as associated with Host V.

IX. Conclusion

The common conventional way to find a host or path in a network involves performance of manual steps by a network administrator. This is disadvantageously slow and labor intensive.

An embodiment of the present invention comprises a network management tool which includes code configured to provide for automated host discovery and path tracing. This is advantageously automated and fast.

A network administrator may use such a tool to more rapidly find specific hosts in a managed network or to more rapidly trace a path between two hosts. Problems in the network may thus be more quickly diagnosed.

In one specific application, a malicious user may be found to be sending invalid or undesired traffic to a network. The network administrator may use such a tool to quickly find the switch port connected to the malicious user and then disable that port.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of host discovery and path tracing, the method comprising:
   determining, by hardware, a closest neighbor switch in a network to a network management server among a plurality of switches in the network, wherein the determining of the closest neighbor switch includes:
   determining a MAC address of the network management server;
   looking up the MAC address of the network management server in an address table stored in a neighbor switch to identify a port of the neighbor switch associated with the MAC address;
   looking up, in a neighbor table stored in the neighbor switch, the port identified from the address table lookup to determine whether any neighbor device is associated with the port in the neighbor table; and
   in response to determining that no neighbor device is associated with the port from the lookup in the neighbor table, determining that the neighbor switch is the closest neighbor switch to the network management server among the plurality of switches in the network;

discovering a location in the network of a source host based on the determining of the closest neighbor switch to the network management server;

discovering a location in the network of a destination host based on the determining of the closest neighbor switch to the network management server; and discovering a path from the source host to the destination host based on the discovered locations.

2. The method of claim 1, further comprising determining the closest neighbor switch to the network management server before performing said discovery steps.

3. The method of claim 1, wherein said look ups and determinations for the determining of the closest neighbor switch are repeated at a plurality of neighbor switches until a next port does not connect to another neighbor switch, at which point a conclusion is made that a current neighbor switch is closest to the network management server.

4. The method of claim 1, wherein the discovering of the path from the source host to the destination host comprises, at a closest neighbor switch to the source host, looking up a first port associated with a MAC address for the destination host, and then determining whether the first port is connected to another neighbor switch.

5. The method of claim 4, wherein the discovering of the path from the source host to the destination host further comprises, if the first port is connected to another neighbor switch, then looking up a next port associated with the MAC address for the destination host, and then determining whether the next port is connected to another neighbor switch.

6. The method of claim 5, wherein said look ups and determinations are repeated until the next port does not connect to another neighbor switch, at which point a conclusion is made that a current neighbor switch is closest to the destination host.

7. The method of claim 1, wherein a MAC address for a host is updated when a discovery traverses a router.

8. The method of claim 1, wherein multiple neighbor switches are checked when a discovery traverses a hub.

9. The method of claim 1, wherein a virtual local area network is specified during a discovery.

10. A non-transitory computer readable medium storing computer-executable code executed by hardware to:

determine a closest neighbor switch in a network to a network management server among a plurality of switches in the network, wherein the code to determine the closest neighbor switch includes code to:

determine a MAC address of the network management server;

look up the MAC address of the network management server in an address table stored in a neighbor switch to identify a port of the neighbor switch associated with the MAC address;

look up, in a neighbor table stored in the neighbor switch, the port identified from the address table lookup to determine whether any neighbor device is associated with the port in the neighbor table; and in response to determining that no neighbor device is associated with the port from the lookup in the neighbor table, determine that the neighbor switch is the closest neighbor switch to the network management server among the plurality of switches in the network; and determine a path between network devices in the network based on determining the closest neighbor switch to the network management server.

11. The non-transitory computer readable medium of claim 10, wherein the code to determine a path between network devices includes code to:

discover a location in the network of a source host;

discover a location in the network of a destination host;

determine closest neighbor switches to the source host and the destination host based on the discovered locations; and discover a path from the source host to the destination host based on port connections for neighbor switches between the closest neighbor switch for the source host and the closest neighbor switch for the destination host.

12. The non-transitory computer readable medium of claim 11, wherein the code to discover the source host location includes code to:

determine a closest neighbor switch to the source host, wherein the closest neighbor switch to the source host is determined by looking up a first port associated with a MAC address for the source host at the closest neighbor switch to the network management server, determine whether the first port is connected to another neighbor switch, and identify the closest neighbor switch to the network management server as a closest neighbor switch closest to the source host in response to a determination that the first port is not connected to another neighbor switch.

13. The non-transitory computer readable medium of claim 12, wherein in response to a determination that the first port is connected to another neighbor switch, the code is to perform the lookup of the first port and the determination of whether the first port is connected to another neighbor switch to determine whether a current neighbor switch is the closest neighbor switch to the source host.

14. A network management device comprising:

a processor; and a memory storing computer-executable code executed by the processor to:

determine an address of the network management device;

look up the address of the network management device in an address table stored in a neighbor switch to identify a port of the neighbor switch associated with the address of the network management device;

look up the port in a neighbor table stored in the neighbor switch to determine whether another neighbor switch is associated with the port of the neighbor switch in the neighbor table;

in response to determining that no other neighbor switch is associated with the port of the neighbor switch from the lookup in the neighbor table, identify that the neighbor switch is a closest neighbor switch to the network management device among a plurality of switches in the network; and determine a path between network devices in the network based on identifying the closest neighbor switch to the network management device.

15. The network management device of claim 14, wherein the neighbor switch is a switch, a router or a hub.

* * * * *